United States Patent
Ajumobi

(10) Patent No.: US 10,502,289 B2
(45) Date of Patent: Dec. 10, 2019

(54) ASYMMETRIC TOROIDAL TRANSMISSION SYSTEM

(71) Applicant: Ayorinde Olusola Ajumobi, Etobicoke (CA)

(72) Inventor: Ayorinde Olusola Ajumobi, Etobicoke (CA)

(73) Assignee: SUPRA LUMINA TECHNOLOGIES INC., Brampton, ON (CA)

( * ) Notice: Subject to any disclaimer, the term of this patent is extended or adjusted under 35 U.S.C. 154(b) by 738 days.

(21) Appl. No.: 14/863,914

(22) Filed: Sep. 24, 2015

(65) Prior Publication Data

US 2016/0377153 A1 Dec. 29, 2016

Related U.S. Application Data

(60) Provisional application No. 62/185,583, filed on Jun. 27, 2015.

(51) Int. Cl.
*F16H 15/38* (2006.01)

(52) U.S. Cl.
CPC ................... *F16H 15/38* (2013.01)

(58) Field of Classification Search
CPC ....................................... F16H 15/38
USPC ............................. 476/40, 42, 46
See application file for complete search history.

(56) References Cited

U.S. PATENT DOCUMENTS

| | | | | |
|---|---|---|---|---|
| 1,715,045 A | * | 5/1929 | Richer | F16H 3/44 475/169 |
| 1,883,565 A | * | 10/1932 | Christiansen | F16H 61/664 476/40 |
| 2,425,188 A | * | 8/1947 | Honigman | F16H 15/38 476/40 |
| 3,237,468 A | * | 3/1966 | Schottler | F16H 15/40 476/10 |
| 3,299,744 A | * | 1/1967 | Kraus | F16H 15/38 180/6.7 |
| 5,601,509 A | | 2/1997 | Munoz | |
| 6,312,358 B1 | | 11/2001 | Goi et al. | |
| 2006/0019796 A1 | * | 1/2006 | Brooks | F16H 15/38 476/42 |
| 2013/0017925 A1 | * | 1/2013 | Burtt | F16H 15/38 476/40 |

FOREIGN PATENT DOCUMENTS

DE     828 377    *   1/1952

* cited by examiner

*Primary Examiner* — William C Joyce
(74) *Attorney, Agent, or Firm* — AP Patents

(57) ABSTRACT

An input shaft being configured into spline engagement with an input wheel wherein the input wheel slides axially along the input shaft; an output shaft into engagement with the input shaft, and wherein an output wheel is configured to slide axially along said output shaft; a variator wheel being configured to drive the input wheel or output wheel without direct contact; a traction fluid to enable the variator wheel to drive at least one of the input wheel and output wheel without direct contact; a toroidal cavity for containing the traction fluid and form an enveloping toroidal cavity when the input wheel and output wheel are aligned together; and an actuator for controlling the axial sliding of the input and output wheel on their respective splined shafts.

18 Claims, 5 Drawing Sheets

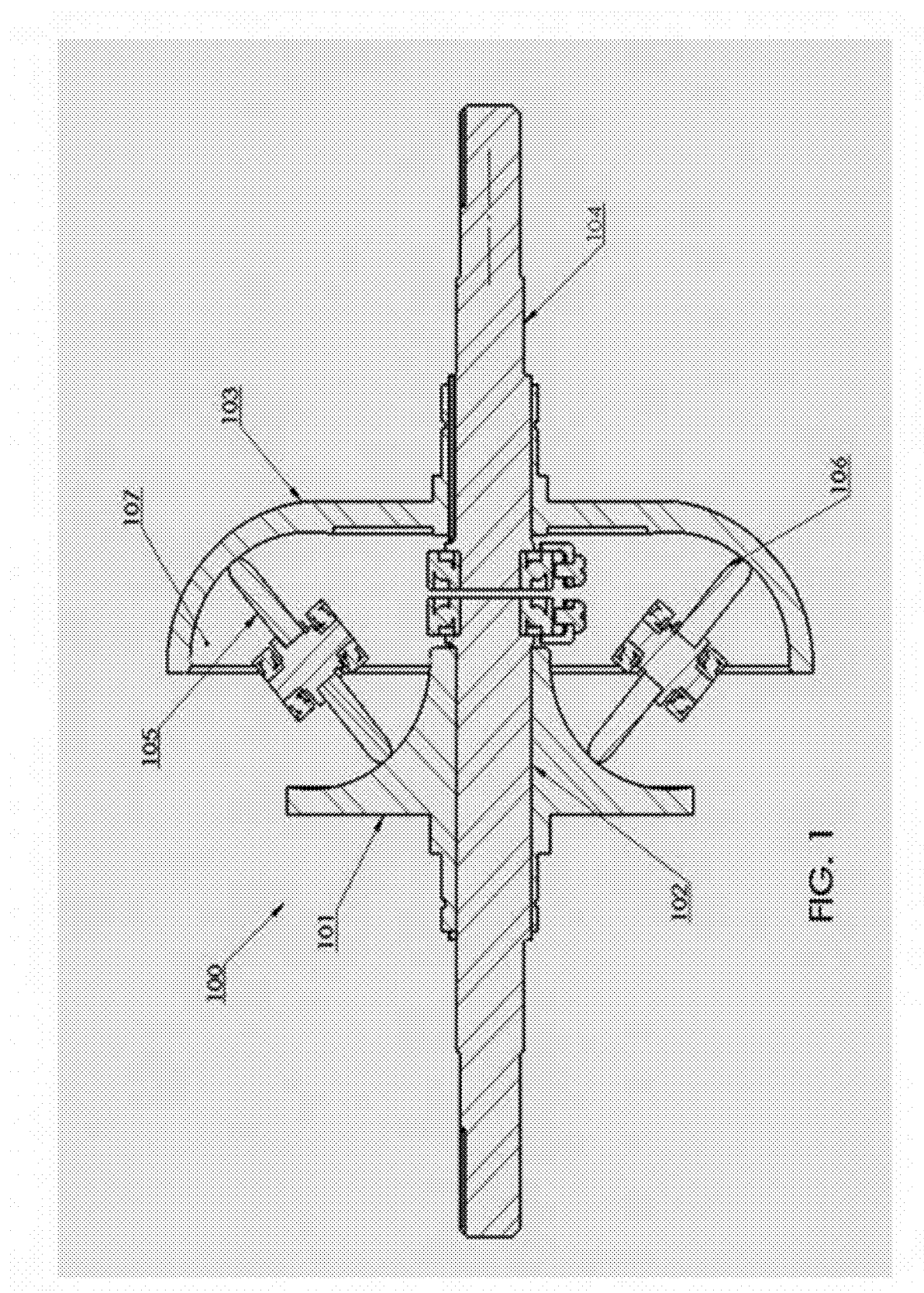

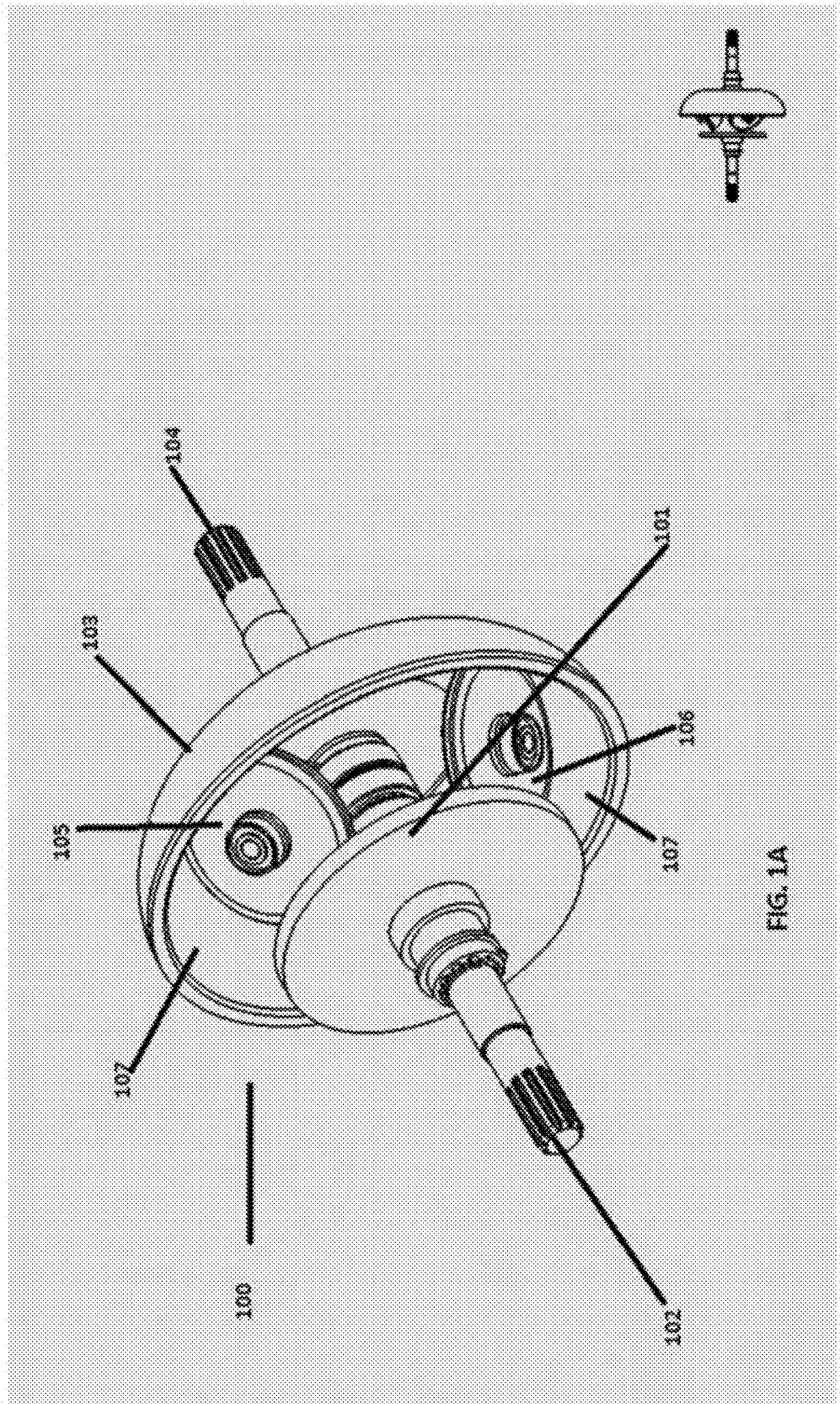

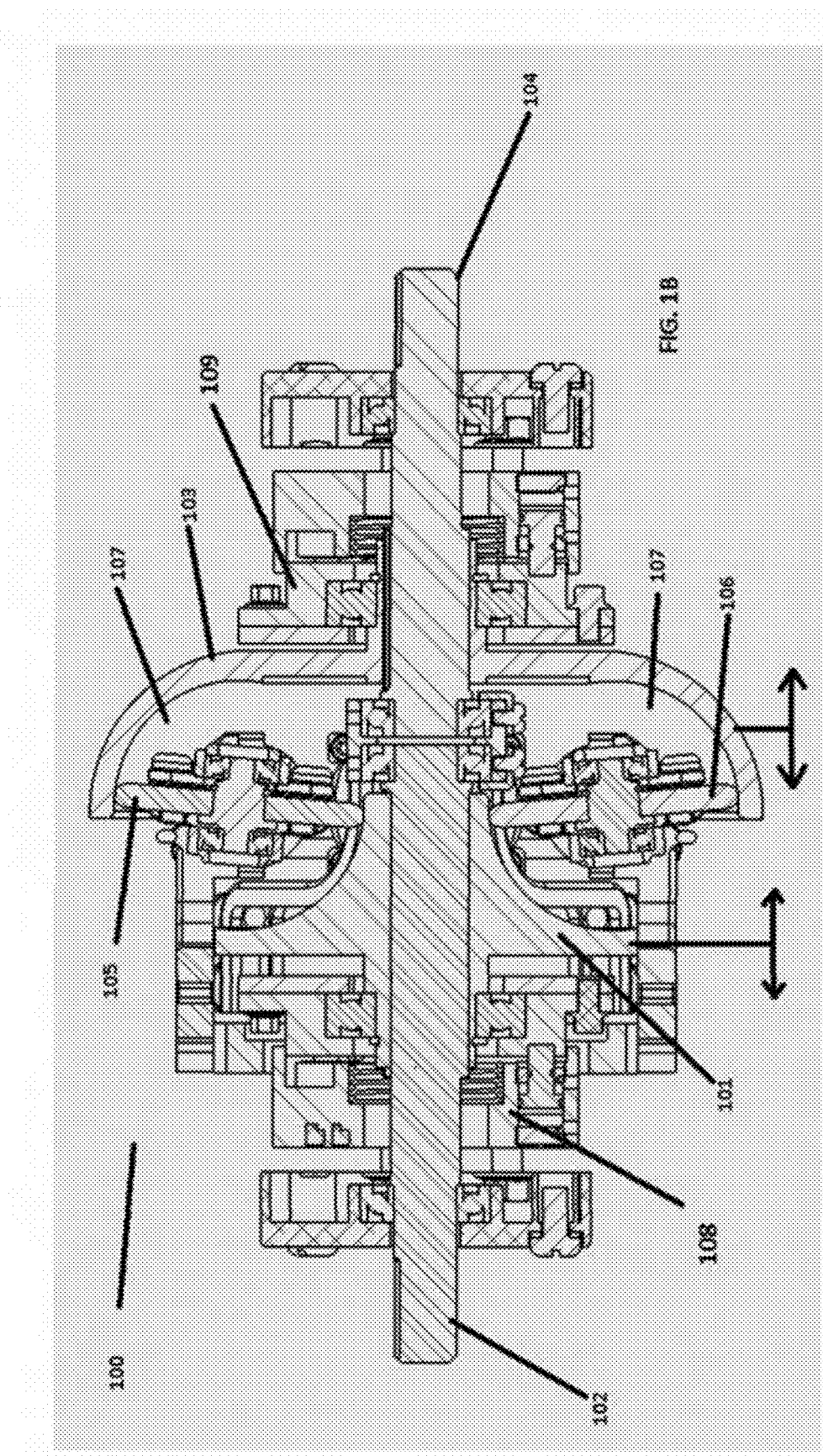

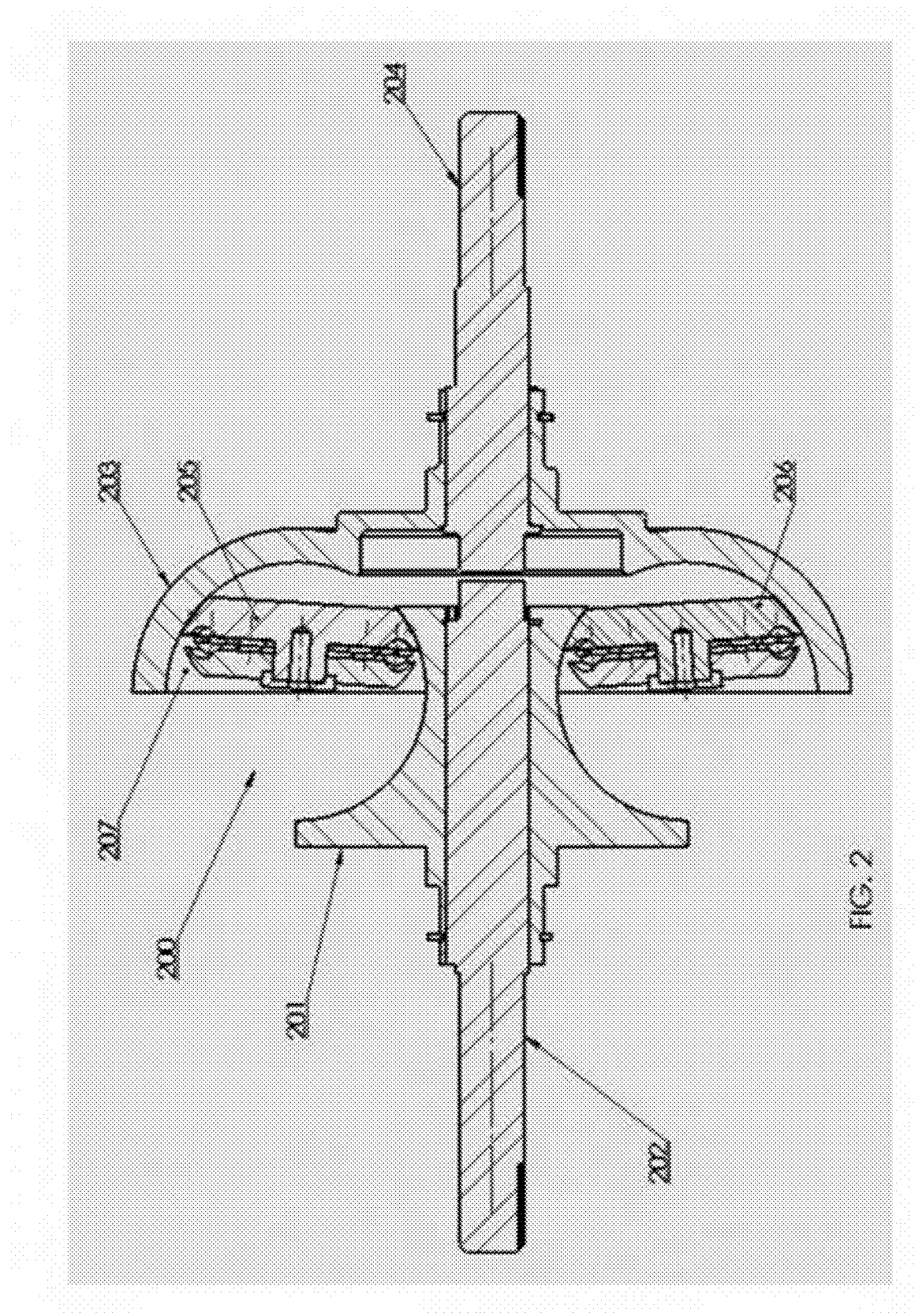

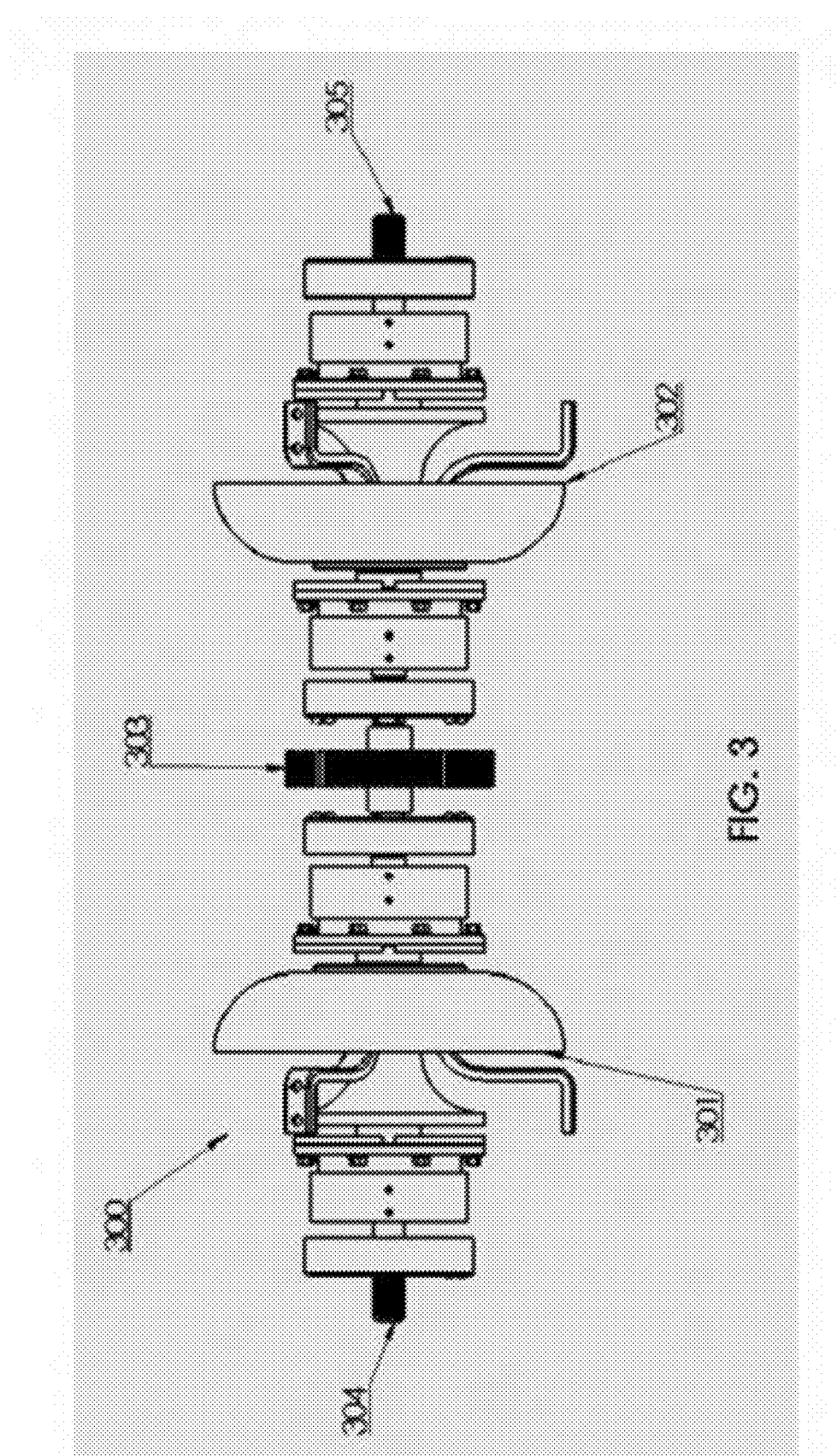

ASYMMETRIC TOROIDAL TRANSMISSION SYSTEM

CROSS-REFERENCE TO RELATED APPLICATIONS

The present Utility patent application claims priority benefit of the U.S. provisional application for patent Ser. No. 62/185,583, entitled "ASSYMETRIC WHEELS WIDE RATIOS TRACTION TRANSMISSION", filed on 27 Jun. 2015, under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to Continuously Variable Transmissions (CVT). More particularly, the invention relates to toroidal traction Continuously Variable Transmissions.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Continuously Variable Transmissions (CVTs) are mechanical transmission systems that may be used to continuously and steplessly vary the velocity and torque ratio between an input and an output shaft. Toroidal traction CVTs generally have symmetrical specially shaped input and output discs or wheels with a variator wheel between the output discs or wheels to vary the ratio between the input and output discs or wheels. Traction Toroidal Transmissions transmit power between the wheels by shearing action of traction fluid trapped between the wheels without actual physical contact. The velocity and torque ratio of a typical toroidal traction CVT generally directly related to the angle of the variator wheel.

Toroidal traction CVTs typically come in two topologies: half toroidal and full toroidal. In half toroidal topologies, the variator wheel pivots off-center of the toroidal cavity; the pivot is not in the center of the circle formed between the input and output wheels which is a hollow circular cross section of the toroidal cavity. In full toroidal topologies, the variator wheel pivots in the exact center of the circle formed between the input and output wheels which is a hollow circular cross section of the toroidal cavity.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that conventional toroidal traction CVTs typically use symmetrical input and output discs or wheels. These CVTs typically have a velocity and torque ratio range of about 2:1 to 2.65:1 (or vice versa). Wider ratio ranges are typically achieved by connecting multiple stages of CVTs together or/and adding supplementary gear arrangement at the output shaft such as suitable epicyclical gear trains.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1, 1A and 1B illustrate an exemplary full toroidal transmission in asymmetric configuration, in accordance with an embodiment of the present invention.

FIG. 2 illustrates an exemplary half toroidal transmission in asymmetric configuration, in accordance with an embodiment of the present invention.

FIG. 3 illustrates an exemplary configuration of toroidal transmissions in double sided form.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys. Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention and variations thereof, relate to a toroidal traction Continuous Variation Transmission (CVT). In one embodiment of the invention, a toroidal traction CVT accepts an input shaft spinning at some velocity and steplessly and continuously varies the velocity and torque of an output shaft.

FIG. 1 illustrates an exemplary full toroidal transmission in asymmetric configuration, in accordance with an embodiment of the present invention. In the present embodiment, asymmetric full toroidal transmission 100 comprises input wheel 101 spline connected to splined input shaft 102, output wheel 103 connected to splined output shaft 104, variator wheels 105 and 106, a third variator wheel (not shown in FIG. 1), and toroidal cavity 107. Toroidal cavity 107 contains a film of traction fluid that enables variator wheels 105, 106, and the third variator wheel to drive input wheel 102 and/or output wheel 103 without direct contact. As illustrated in FIG. 1B, 108 is the input wheel actuator and 109 is the output wheel actuator.

Asymmetric full toroidal transmission 100 has asymmetric input and output wheel design such that toroidal cavity 107 almost completely envelopes variator wheels 105, 106, and a third variator wheel (not shown in FIG. 1). Input wheel 101 and output wheel 103 are asymmetric and are each uniquely shaped such that an almost completely enveloping toroidal cavity 107 is formed when input wheel 101 and output wheel 103 are aligned together. In an embodiment, input wheel 101 and output wheel 103 have vastly different radiuses which makes it possible to have a superior ratio range over existing systems, which generally have identically sized and shaped input and output wheels. In another embodiment, the difference in radius between the minimum radius of one wheel and the maximum radius of the other wheel in FIG. 1 is approximately 1:5. In yet another embodiment, input wheel 101 and output wheel 103 have vastly different radiuses and are shaped such that variator wheels 105, 106, and the third variator wheel have sufficient cavity surface area to rotate/sweep much more than known t-CTV systems Total sweep measured clockwise in FIG. 1 is 90+5+5=100 degrees. The 5 degrees is the maximum angle swept when operating in an opposite of its bias: meaning 0.8:1 as opposed to its bias of 5:1 theoretical. The maximum rotation/sweep angle of variator wheels 105, 106, and the third variator wheel are up to just above 95 degrees from minimum to maximum and allows for a theoretical minimum velocity and torque ratio of between 0.8 to 1 and up to 5 to 1, and vice versa.

During typical operation, splined input shaft 102 accepts input power and transfers input power to input wheel 101. Variator wheels 105, 106, and the third variator wheel are adjusted by pivoting around the center of toroidal cavity 107 that input power from input wheel 101 is transferred to output wheel 103 at a velocity and torque ratio determined by the angle of variator wheels 105, 106, and the third variator wheel. Output wheel 103 transfers power to splined output shaft 104 which is the output of asymmetric full toroidal transmission 100. Variator wheels 105, 106, and the third variator wheel may be adjusted such that power is transmitted bidirectionally. Asymmetrical full toroidal transmission 100 may work as a reducer or multiplier of splined input shaft 102 velocity and torque to splined output shaft 104 velocity and torque. A reduction or multiplication factor for an asymmetrical full toroidal transmission are partly determined by the radius difference of input wheel 101 and output wheel 103. Asymmetrical full toroidal transmissions may be biased as either a multiplier or a reducer depending on input wheel 101 and output wheel 103.

The connection between input wheel 101 with splined input shaft 102 and output wheel 103 with splined output shaft 104 allows input wheel 101 and output wheel 103 to slide axially. An actuator, 108 allows for control of the sliding of input wheel 101 and actuator 109 for output wheel 103. The sliding controls traction oil film thickness (FIG. 1B shows the arrows to indicate the direction of slight sliding, to and fro fractionally while rotating as well as actuators). Oil film thickness refers to the depth of the oil film on the surface of the wheels that actually prevent the wheels from making contact. A film of traction fluid contained in toroidal cavity 107 may have a variable thickness and/or traction coefficient dependent on the axial position of input wheel 101 and/or output wheel 103 on their respective splined shafts Oil film thickness for maximum traction depends on traction oil temperature and oil formulation, such that in order to reduce traction and hence the torque transmitted between the wheels, the rotating input and output wheel can be made to slide axially apart on their respective splined shaft to increase oil film thickness. On the other hand, to reduce oil film thickness below the ideal by axially sliding the rotating input and output wheels too close towards each other, means risking actual physical contact between the input and output wheels and the variator wheels.

It may be appreciated by a person with ordinary skill in the art that varying the film thickness of traction fluid may provide a gradual and smooth connection between a variator wheel and an input wheel 101 or an output wheel 103. In another embodiment of the present invention, a clutch may not be needed for a gradual and smooth connection between a variator wheel and an input wheel 101 or an output wheel 103. The thickness of a film of traction fluid is deliberately controlled by the axial sliding of inner wheel 101 and/or outer wheel 103 such that slipping can be made to deliberately occur for gradual engagement of the asymmetric full toroidal transmission 100.

It may be appreciated by a person with ordinary skill in the art that the film of traction fluid in toroidal cavity 107 may be nearly any fluid that provides traction. Oil film thickness refers to the depth of the oil film on the surface of the wheels that actually prevent the wheels from making contact. All fluids have a traction coefficient. Traction fluids for CVT transmission are specially formulated oils depending on intended use. These traction fluids have a peculiar behavior. They instantaneously harden (as much as steel) for approximately milliseconds when they are stressed then become normal, such as when the oil film is squeezed between two rotating wheels. Similar thing happens when someone riding on water ski falls into the water. It is like hitting a solid for an instant and later gives way.

It may be appreciated by a person with ordinary skill in the art that full toroidal transmission 100 may be designed with one or more variator wheels and multiple toroidal cavities. Another embodiment of the invention may have only one variator wheel and toroidal cavity. In still another embodiment of the present invention, three variator wheels are placed at 120 degree intervals to optimize limited space in toroidal cavity 107.

It may be appreciated by a person with ordinary skill in the art that full toroidal transmission 100 may not be designed with splined input shaft 102 and splined output shaft 104. Another embodiment of the invention may have an input and output shafts melded with corresponding input and output wheels. Still another embodiment of the invention may have input and output shafts connected via gears to input and output wheels. In still another embodiment of the invention may have two output wheels 103, formed opposite one another as a single component, and two input wheels 101, mounted on opposite sides of the output wheels 103. Input wheels 101 are connected by a common shaft that passes through the axis of the output wheels 103 by way of a center bearing. Variator wheels 105, 106, and a third variator wheel are synchronized to pivot at the same time and rate to constitute a double cavity type.

It may be appreciated by a person with ordinary skill in the art that full toroidal transmission 100 may be designed with variator wheels being controlled to pivot electrically. Another embodiment of the invention may be designed with variator wheels being controlled to pivot by a suitable mechanical arrangement.

It may be appreciated by a person with ordinary skill in the art that full toroidal transmission 100 may be designed with axial slide movement control for splined input shaft 102 with input wheel 101 and splined output shaft 104 with output wheel 103. Another embodiment of the invention may have, but not limited to, actuators to independently control the axial slide movement of the shafts and wheels for transmission input and output.

FIG. 1A illustrates a 3 dimensional view of asymmetric full toroidal transmission 100 of FIG. 1.

FIG. 1B illustrates the input wheel actuator 108 and the output wheel actuator 109 as well as variator wheels 105 and 106 of FIG. 1 almost vertical, at an approximately 85 degrees of inclination relative to the common axis of the wheels and shafts 102 and 104.

FIG. 2 illustrates an exemplary half toroidal transmission in asymmetric configuration, in accordance with an embodiment of the present invention. In the present embodiment, asymmetric half toroidal transmission 200 comprises input wheel 201 connected to splined input shaft 202, output wheel 203 connected to splined output shaft 204, variator wheels 205 and 206 and a $3^{rd}$ wheel not shown, and toroidal cavity 207. Toroidal cavity 207 contains a film of traction fluid that enables variator wheels 205 and 206 to drive input wheel 202 and/or output wheel 203 without direct contact.

Asymmetric half toroidal transmission 200 is a half toroidal design such that toroidal cavity 207 almost completely envelopes variator wheels 205, 206 and a $3^{rd}$ not shown. Variator wheels 205 and 206 pivot off-center of toroidal cavity 207; where the center of toroidal cavity 207 is the center of a hollow circular cross section of toroidal cavity 207 formed between input wheel 201 and output wheel 203. Input wheel 201 and output wheel 203 are asymmetric and are each uniquely shaped such that toroidal cavities 207 and/or 208 are formed when input wheel 201 and output wheel 203 are aligned together. Input wheel 201 and output wheel 203 have vastly different radiuses and are shaped such that variator wheels 205 and 206 have sufficient cavity surface area to rotate. The difference in radius between the minimum radius of one wheel and the maximum radius of the other wheel in FIG. 2 is about 1:4 or vice versa. The maximum rotation angle of variator wheels 205 and 206 is up to just above 95 degrees and allows for a theoretical minimum velocity and torque ratio of 0.8 to 1 and a theoretical maximum velocity and torque ratio of up to 4 to 1, and vice versa.

During typical operation, splined input shaft 202 accepts input power and transfers input power to input wheel 201. Variator wheels 205 and 206 are adjusted by pivoting slightly off the center of toroidal cavity 207 such that input power from input wheel 201 is transferred to output wheel 203 at a velocity and torque ratio determined by the angle of variator wheels 205 and 206. Output wheel 203 transfers power to splined output shaft 204 which is the output of asymmetric full toroidal transmission 200. Variator wheels 205 and 206 may be adjusted such that power is transformed bidirectionally; asymmetrical half toroidal transmission 200 may work as a reducer or multiplier of splined input shaft 202 velocity and torque to splined output shaft 204 velocity and torque. A reduction or multiplication factor for an asymmetrical half toroidal transmission are partly determined by the size of input wheel 201 and output wheel 203. Asymmetrical half toroidal transmissions may be more biased as either a multiplier or a reducer depending on input wheel 201 and output wheel 203.

The connection between input wheel 201 with splined input shaft 202 and output wheel 203 with splined output shaft 204 allows input wheel 201 and output wheel 203 to slide axially. An actuator or arm may allow for control of the sliding of input wheel 201 and output wheel 203. A film of traction fluid contained in toroidal cavity 207 may have a variable thickness and/or traction coefficient dependent on the position of input wheel 201 and/or output wheel 203 on their respective splined shafts. Oil film thickness for maximum traction depending on traction oil temperature and oil formulation, such that in order to reduce traction and hence the torque transmitted between the wheels, the rotating input and output wheel can be made to slide axially apart on their respective splined shaft to increase oil film thickness more than the ideal thickness. On the other hand, to reduce oil film thickness to less than the ideal by axially sliding the rotating input and output wheels towards each other, means risking actual physical contact between the input and output wheels and the variator wheels.

It may be appreciated by a person with ordinary skill in the art that varying the film thickness of traction fluid may provide a gradual and smooth connection between a variator wheel and an input wheel 201 or an output wheel 203. In another embodiment of the present invention, a clutch is may not be needed for a gradual and smooth connection/disconnection between a variator wheel and an input wheel 201 or an output wheel 203. The thickness of a film of traction fluid is deliberately controlled by the sliding of inner wheel 201 and/or outer wheel 203 such that slipping can be made to occur during engagement of asymmetric half toroidal transmission 200.

It may be appreciated by a person with ordinary skill in the art that the film of traction fluid in toroidal cavity 207 may be nearly any fluid that provides traction. All fluids have a traction coefficient. Traction fluids have a peculiar behavior. They instantaneously harden (as much as steel) for milliseconds when they are stressed then become normal, such as when the oil film is squeezed between two rotating wheels. Similar thing happens when someone riding on water ski falls into the water. It is like hitting a solid for an instant and later gives way. Traction fluid in toroidal cavity 207 may be, but not limited to, specially formulated oils depending on intended use.

It may be appreciated by a person with ordinary skill in the art that half toroidal transmission 200 may be designed with one or more variator wheels and multiple toroidal cavities. Another embodiment of the invention may have only one variator wheel and toroidal cavity. In still another embodiment of the present invention, three variator wheels are placed at 120 degree intervals to optimize limited space in toroidal cavity 107.

It may be appreciated by a person with ordinary skill in the art that half toroidal transmission 200 may not be designed with splined input shaft 202 and splined output shaft 204. Another embodiment of the invention may have an input and output shafts melded with corresponding input and output wheels. Still another embodiment of the invention may have input and output shafts connected via gears to input and output wheels. In still another embodiment of the invention may have two output wheels 203, formed opposite one another as a single component, and two input wheels 201, mounted on opposite sides of the output wheels 203. Input wheels 201 are connected by a common shaft that passes through the axis of the output wheels 203 by way of a center bearing. Variator wheels 205 and 206 are synchronized to pivot at the same time and rate to constitute a double cavity type.

It may be appreciated by a person with ordinary skill in the art that full toroidal transmission 200 may be designed with variator wheels being controlled to pivot electrically. Another embodiment of the invention may be designed with variator wheels being controlled to pivot by a suitable mechanical arrangement.

It may be appreciated by a person with ordinary skill in the art that full toroidal transmission 200 may be designed with axial slide movement control for splined input shaft 202 with input wheel 201 and splined output shaft 204 with output wheel 203. Another embodiment of the invention may have, but not limited to, actuators to independently control the axial slide movement of the shafts and wheels for transmission input and output.

FIG. 3 illustrates an exemplary configuration of two toroidal transmissions driven in parallel to form a double sided unit, in accordance with an embodiment of the present invention. Double sided toroidal transmission 300 comprising of toroidal transmissions 301 and 302 is driving a common output gear 303. Input power is provided at input shafts 304 and 305 for toroidal transmissions 301 and 302 respectively.

It may be appreciated by a person with ordinary skill in the art that double sided toroidal transmission 300 may be designed with any combination of full or half toroidal transmissions as toroidal transmissions 301 and 302. Another embodiment of the invention may have, but not limited to, a configuration in double sided toroidal transmission 300 comprises of one toroidal transmission as a full toroidal transmission and the other toroidal transmission as a half toroidal transmission.

It may be appreciated by a person with ordinary skill in the art that double sided toroidal transmission 300 may be designed in a series and/or parallel configuration with multiple toroidal transmissions. Another embodiment of the invention may have, but not limited to, a plurality of toroidal transmissions, with independent input powers, driving an output gear. Still another embodiment of the invention may have a series of toroidal transmission driving an output gear at a velocity and torque ratio that is greater than the velocity and torque ratio that can be achieved by a single toroidal transmission stage.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing toroidal traction Continuously Variable Transmissions according to the present invention will be apparent to those skilled in the art. Various aspects of the invention have been described above by way of illustration, and the specific embodiments disclosed are not intended to limit the invention to the particular forms disclosed. The particular implementation of the toroidal traction Continuously Variable Transmissions may vary depending upon the particular context or application. By way of example, and not limitation, the toroidal traction Continuously Variable Transmissions described in the foregoing were principally directed to machine implementations requiring variable speed transmissions such as automobiles, aircraft, and sea vessels; however, similar techniques may instead be applied to exercise equipment and power generators, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
   an input wheel;
   an input shaft, said input shaft comprising a spline input shaft, wherein said input shaft being configured into an engagement with said input wheel, and wherein said input wheel is configured to generally slide proximately axially along said input shaft;
   an output shaft being axially aligned with said input shaft, said output shaft is at least a spline output shaft;
   an output wheel, said output wheel being configured into an engagement with said output shaft, wherein said output wheel is proximately asymmetric with said input wheel, and wherein said output wheel is configured to generally slide proximately axially along said output shaft;
   a variator wheel, in which said variator wheel being configured to drive at least one of said input wheel and output wheel without direct contact therewith, said variator wheel comprising a tapered peripheral edge surface, an angle of sweep of said variator wheel comprising at least 95 degrees while transmitting torque from said input wheel to said output wheel;
   a traction fluid, said traction fluid trapped between said tapered peripheral surface and face surfaces of said input and output wheels, said traction fluid being operable to enable said variator wheel to drive at least one of said input wheel and said output wheel without a direct contact therewith due to shearing forces in said traction fluid;
   said input wheel and output wheel have substantially different radius and shape being configured to provide a toroidal cavity, said toroidal cavity being configured to substantially contain said traction fluid, wherein said toroidal cavity being operable to form a substantially enveloping toroidal cavity when said input wheel and said output wheel are approximately aligned together and being configured to substantially wraparound said variator wheel for said variator wheel to rotate or sweep; and
   two actuators, one of said two actuators being configured to control an axial sliding of said input wheel and another one of said two actuators being configured to control an axial sliding of said output wheel on their respective splined shafts, in which said two actuators are further configured to vary a thickness of said traction fluid between said variator wheel and said input and output wheels by sliding said input and output wheels at least one of apart from each other and towards each other.

2. The system of claim 1, further comprising an input power, in which said input power is coupled and transferred to said input wheel, wherein said input power from said input wheel is transferred to said output wheel at a velocity and torque ratio based on a rotation angle of said variator wheel.

3. The system of claim 1, wherein said two actuators axially slide said input and output wheels apart from each other to reduce a traction and a torque transmitted between said input and output wheels, and wherein said input and output wheels sliding axially apart from each other increase said thickness of said traction fluid.

4. The system of claim 1, wherein said two actuators axially slide said input and output wheels towards each other to increase traction and torque transmitted between the input and output wheels, and wherein said input and output wheels sliding axially towards each other decrease said thickness of said traction fluid.

5. The system of claim 1, in which said variator wheel further comprising at least more than one variator wheel.

6. The system of claim 1, in which said variator wheel further comprising at least three variator wheels spaced apart by approximately 120 degrees.

7. The system of claim 1, wherein said two actuators axially slides said input and output wheels apart from each other to reduce traction and torque transmitted between the input and output wheels, and wherein said input and output wheels sliding axially apart from each other increase said thickness of said traction fluid, and wherein said two actuators axially slides said input and output wheels towards each other to increase traction and torque transmitted between said input and output wheels, and wherein said input and output wheels sliding axially towards each other decrease said thickness of said traction fluid.

8. The system of claim 1, further comprising an asymmetric full toroidal transmission being configured to bias at least one of a multiplier and a reducer based on a radius difference between said input wheel and said output wheel.

9. The system of claim 1, wherein a maximum sweep angle of said variator wheel rotation is 100 degrees.

10. A system comprising:
an input wheel;
an input shaft, said input shaft being configured into an engagement with said input wheel, and wherein said input wheel is configured to generally slide axially with said input shaft;
an output shaft being axially aligned with said input shaft, wherein said output wheel is configured to generally slide axially with said output shaft;
an output wheel, said output wheel being configured into an engagement with said output shaft, wherein said output wheel is proximately asymmetric with said input wheel in which said input wheel and said output wheel have substantially different radius and shape;
a variator wheel, said variator wheel comprising at least more than one variator wheel, in which said variator wheel being configured to drive at least one of said input wheel and output wheel, and wherein an angle of sweep of said variator wheel comprising at least 95 degrees while transmitting torque from said input wheel to said output wheel;
a traction fluid trapped between a peripheral surface of said variator wheel and face surfaces of said input and output wheels, said traction fluid said traction fluid being operable to enable said variator wheel to drive said at least one of said input wheel and said output wheel without a direct contact therewith due to shearing forces in said traction fluid;
a toroidal cavity being configured for said variator wheel to rotate or sweep, wherein a toroidal cavity surface area is further configured to substantially contain said traction fluid and substantially wraparound said variator wheel; and
an actuator, said actuator being configured to control an axial sliding of said input wheel or said output wheel and their respective shafts, in which said actuator is further configured to vary a thickness of said traction fluid between said variator wheel and said output wheel by sliding the input and output wheel at least one of apart from each other and towards each other.

11. The system of claim 10, further comprising an input power, in which said input power is coupled and transferred to said input wheel, wherein said input power from said input wheel is transferred to said output wheel at a velocity and torque ratio determined by said angle of said variator wheel.

12. The system of claim 10, wherein said input shaft being melded with said input wheel and said output shaft being melded with said output wheel.

13. Asymmetric toroidal transmission system comprising:
an input wheel;
an input shaft, said input shaft comprising a spline input shaft, wherein said input shaft being configured into an engagement with said input wheel, and wherein said input wheel is configured to generally slide proximately axially along said input shaft;
an output shaft being axially aligned with said input shaft, said output shaft is at least a spline output shaft;
an output wheel, said output wheel being configured into an engagement with said output shaft, wherein said output wheel is proximately asymmetric with said input wheel, and wherein said output wheel is configured to generally slide proximately axially along said output shaft;
a variator wheel, in which said variator wheel being configured to drive at least one of said input wheel and said output wheel without a direct contact, wherein an angle of sweep of said variator wheel comprising at least 95 degrees while transmitting torque from said input wheel to said output wheel;
a traction fluid trapped between a peripheral surface of said variator wheel and face surfaces of said input and output wheels, said traction fluid being operable to enable said variator wheel to drive said at least one of said input wheel and output wheel without a direct contact therewith due to shearing forces in said traction fluid;
a toroidal cavity, said toroidal cavity being configured to substantially contain said traction fluid, wherein said toroidal cavity being operable to form a substantially enveloping toroidal cavity when said input wheel and said output wheel are approximately aligned together and being configured to substantially wraparound said variator wheel;
an actuator, said actuator being configured to control an axial sliding of said input wheel or said output wheel on their respective splined shafts, in which said actuator is further configured to vary a thickness of said traction fluid between said variator wheel and said output wheel by sliding the input and output wheel at least one of apart from each other and towards each other; and
an input power, in which said input power is coupled and transferred to said input wheel, wherein said input power from said input wheel is transferred to said output wheel at a velocity and torque ratio determined by said angle of said variator wheel.

14. The system of claim 13, in which said actuator comprises a pair of actuators, each being further configured to control said axial sliding of said input wheel and said output wheel on their respective shafts independently.

15. The asymmetric toroidal transmission system of claim 13, in which said input wheel and output wheels have substantially different radius and shape being configured to provide a toroidal cavity surface area for said variator wheel to rotate or sweep.

16. The asymmetric toroidal transmission system of claim 13, further comprising an output gear coupled to a free end of said output shaft.

17. Asymmetric toroidal transmission system comprising:
an input shaft;
an input wheel being configured for an axial sliding along said input shaft;
an output shaft being axially aligned with said input shaft;
an output wheel, said output wheel being configured for an axial sliding along said output shaft, said output wheel being asymmetric with said input wheel;
a toroidal cavity;
three variator wheels disposed within said toroidal cavity and being mounted to or sweep, an angle of sweep of each variator wheel from said three variator wheels comprising at least 95 degrees while transmitting torque from said input wheel to said output wheel;
a traction fluid trapped, during use of said asymmetric toroidal transmission system between a tapered peripheral surface of said each variator wheel from said three variator wheels and face surfaces of said input and output wheels, said traction fluid being operable to enable said each variator wheel to drive said at least one of said input wheel and said output wheel without a direct contact therewith due to shearing forces in said traction fluid; and two actuators, one of said two actuators being configured to control said axial sliding of said input wheel and another one of said two actuators being configured to control said axial sliding of said output wheel, said two actuators being further configured to vary a thickness of said traction fluid between said variator wheel and said input and output wheels by sliding said input and output wheels at least one of apart from each other and towards each other.

18. The asymmetric toroidal transmission system of claim 17, wherein said asymmetric toroidal transmission being configured to bias at least one of a multiplier and a reducer based on a radius difference between said input wheel and said output wheel.

\* \* \* \* \*